United States Patent
Waldstädt et al.

(10) Patent No.: US 8,911,284 B2
(45) Date of Patent: Dec. 16, 2014

(54) TRANSPORTATION DEVICE WITH STAR WHEELS

(71) Applicant: Poly-Clip System GmbH & Co. KG, Hattersheim (DE)

(72) Inventors: Manfred Waldstädt, Mainz (DE); Detlef Reiter, Wiesbaden (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 206 days.

(21) Appl. No.: 13/626,535

(22) Filed: Sep. 25, 2012

(65) Prior Publication Data
US 2013/0267156 A1   Oct. 10, 2013

(30) Foreign Application Priority Data
Sep. 26, 2011   (EP) ..................... 11007838

(51) Int. Cl.
*A22C 11/00*   (2006.01)
*A22C 15/00*   (2006.01)

(52) U.S. Cl.
CPC ............ *A22C 11/00* (2013.01); *A22C 15/001* (2013.01)
USPC ...................................................... 452/51

(58) Field of Classification Search
USPC ............ 452/21–26, 30–32, 35–37, 46–48, 51
See application file for complete search history.

(56) References Cited

U.S. PATENT DOCUMENTS

| | | | | |
|---|---|---|---|---|
| 5,100,364 A * | 3/1992 | Kollross et al. | ............... | 452/185 |
| 7,258,604 B2 * | 8/2007 | Reutter | ................ | 452/30 |
| 7,942,728 B2 * | 5/2011 | Sames | ................ | 452/51 |
| 7,975,834 B2 | 7/2011 | Kessler | | |
| 8,308,533 B2 * | 11/2012 | Haslacher | ................ | 452/32 |
| 8,366,523 B2 | 2/2013 | Töpfer | | |
| 8,696,415 B2 * | 4/2014 | Topfer | ................ | 452/51 |
| 8,708,783 B2 * | 4/2014 | Tamaki | ................ | 452/51 |
| 8,747,192 B2 * | 6/2014 | Sames | ................ | 452/51 |

FOREIGN PATENT DOCUMENTS

| | | |
|---|---|---|
| DE | 3806467 C1 | 5/1989 |
| DE | 102006054039 A1 | 5/2008 |
| EP | 1985185 A1 | 10/2008 |
| EP | 2103221 A1 | 9/2009 |
| EP | 2156743 A1 | 2/2010 |
| EP | 224118 A1 | 10/2010 |

* cited by examiner

*Primary Examiner* — Richard Price, Jr.

(74) *Attorney, Agent, or Firm* — Hahn Loeser & Parks LLP

(57) ABSTRACT

The present invention relates to a transportation device for transporting sausage-shaped products with suspension elements from a clipping machine to a handling device. The transportation device comprises a conveying unit, a catching unit for catching the suspension element attached to one end of the sausage-shaped product, and a guide unit for guiding the suspension element caught by the catching unit to said handling device comprising a longitudinally extending guide element and supports for supporting the guide element, wherein the supports provide a passage way for the suspension element to be guided along the guide element. The supports include gear wheels arranged rotatably about an at least substantially horizontally aligned axis engaging the guide element. Moreover, there are provided ratchets for engaging the gear wheels adapted to position a gap between two subsequent teeth of said gear wheels in the passage way of said suspension element.

9 Claims, 2 Drawing Sheets

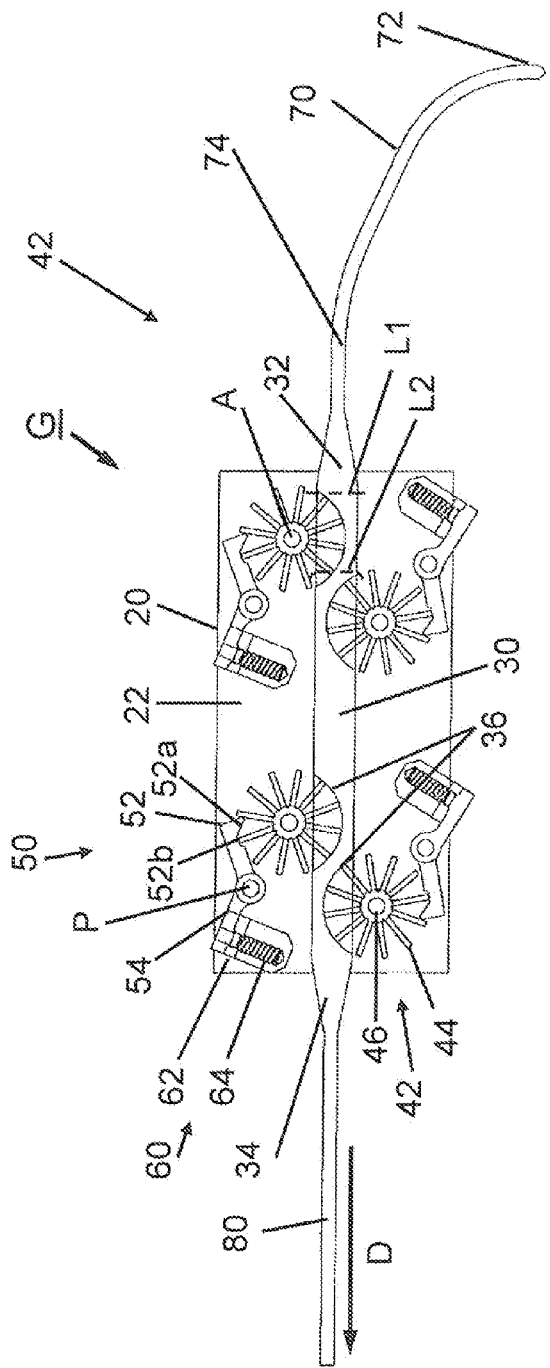

TRANSPORTATION DEVICE WITH STAR WHEELS

This application claims priority to, and the benefit of, European Patent Application No. 11 007 838.3 filed Sep. 26, 2011 with the European Patent Office, which is hereby incorporated by reference.

BACKGROUND OF THE INVENTION

The present invention relates to a transportation device for transporting sausage-shaped products, like sausages, with suspension elements, like loops, from a clipping machine to a handling device.

In particular, the present invention relates to a transportation device for transporting sausage-shaped products, like sausages, with suspension elements, like loops, from a clipping machine to a handling device for said sausage-shaped products like a storage device including a bar-shaped storing element, like a smoking rod. The transportation device comprises a conveying unit for conveying a sausage-shaped product just produced out of the clipping machine in a transportation direction and a catching unit for catching the suspension element attached to one end of the sausage-shaped product. The transportation device further comprises a guide unit for guiding the suspension element caught by the catching unit to said handling device. The guide device comprises a longitudinally extending guide element and supporting means for supporting the guide element, wherein the supporting means provide a passage way for the loop to be guided along the guide element.

In the practice, it is known that, for example in the production of sausage-shaped products, like sausages, a filling material is fed by a filling machine through a filling tube of a clipping machine into a tubular casing material, which is stored on the filling tube and which is closed at its front end, referred to the feeding direction, by a closing clip. The tubular casing material is pulled-off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion forming the back end of the sausage shaped product by respective closing tools which are reversibly movable towards the plait-like portion. After that the sausage-shaped product just produced, is separated from the remaining casing material by a knife or the like of a cutting device of the clipping machine and is transferred to a storage device or another machine for the next producing step.

From DE patent 38 06 467, an apparatus for producing sausages, and transferring said sausages to a storage device, in particular to a smoking rod, is known. The device for discharging the sausage just produced out of the clipping machine and transferring said sausage to the smoking rod of said known apparatus includes a sword having a first or tip end directed towards the clipping machine, for catching the suspension loop attached to said sausage, as well as a second end opposite to the tip end. Moreover, there is provided a chain conveyor for transferring the sausages hanging on the sword to a smoking rod. A belt conveyor carries the sausage just produced out of the clipping machine, whereby the suspension loop is shifted along the sword. For holding the sword in position, and for enabling the suspension loop passing the sword, said sword is held by pistons laterally engaging the sword. For allowing the suspension loop to pass the pistons, said pistons can alternately be disengaged from the sword.

For a trouble-free operation, a complex control of said apparatus is necessary, like coordinating the movement of the pistons with the transportation speed of the belt conveyor and the production rate of the clipping machine. Moreover, said pistons may not be moved at a high speed, thereby limiting the maximum production rate of the clipping machine.

Thus, it is an object of the present invention to provide a transportation device for transporting sausage-shaped products from a clipping machine to a handling device with which the above mentioned drawbacks are overcome and which enables a save transfer or transportation, respectively, of said sausage-shaped products from said clipping machine to said handling device.

The aforesaid object is achieved by the features of claim 1. Advantageous configurations of the clipping machine are described in claims 2 to 9.

BRIEF SUMMARY OF THE INVENTION

According to the present invention, there is provided a transportation device for transporting sausage-shaped products, like sausages, with suspension elements, like loops, from a clipping machine to a handling device for said sausage-shaped products, like a storage device including a bar-shaped storing element, like a smoking rod. The transportation device comprises a conveying unit for conveying a sausage-shaped product just produced out of the clipping machine in a transportation direction and a catching unit for catching the suspension element attached to one end of the sausage-shaped product. The transportation device further comprises a guide unit for guiding the suspension element caught by the catching unit to said handling device. The guide unit comprises a longitudinally extending guide element and supporting means for supporting the guide element, wherein the supporting means provide a passage way for the loop to be guided along the guide element.

In an advantageous embodiment of the inventive transportation device, the supporting means include gear or star wheels arranged rotatably about an at least substantially horizontally aligned axis, engaging the guide element; and there are provided ratchets for engaging the gear wheels, adapted to position a gap between two subsequent teeth of said gear wheels in the passage way of said suspension element.

In this configuration, the guide element is securely held in position by the gear wheels. Moreover, when positioning the gear wheels with a gap between two subsequent teeth of said gear wheels in the passage way of said suspension element, a save guidance of the suspension element along the guide element is ensured, in particular, any blocking of the suspension element is avoided.

According to a further advantageous embodiment, recesses are provided in the guide element, into which the gear wheels engage or interfere, respectively. Thereby, the guide element is securely held in position by said gear wheels without blocking the passage way of the suspension elements.

At the end of the guide element facing the clipping machine, the catching unit, like a catching pin or needle, is mounted and held in position by said guide element. In order to prevent the guide element, and thus, also the catching transportation, from being displaced or from being brought out of alignment with the clipping machine, at least four gear wheels are provided, two gear wheels are positioned below the guide element and two gear wheels are positioned above the guide element. In this configuration, space is left on both sides of the guide element, for accurately place the conveying unit, like a conveyor belt, e.g. dependent on the length and/or the diameter of the sausage-shaped product, for carrying said sausage-shaped product out of the clipping machine.

According to a further embodiment of the inventive discharge device, at least four ratchets are provided, each of which engage one of the at least four gear wheels. In this embodiment, each of the gear wheels is provided with a ratchet for securely positioning the gap between two subsequent teeth of said gear wheels in the passage way of said suspension element.

For further preventing the guide element from being displaced or from being brought out of alignment with the transportation means of the clipping machine, the recesses in the guide element correspond to the shape of the gear wheels. For example, by selecting a width of the recesses, at least approximately corresponding to the width of the gear wheels, rotation of the guide unit about its longitudinal axis is prevented or at least minimized.

For a further stabilization of the guide unit, the gear wheels positioned below the guide element and the gear wheels positioned above the guide element are aligned with a horizontal offset to each other. In this configuration, only one of the gear wheels is rotated at a time, while a suspension element is guided along the guide element, whereby the frictional forces acting on the guide element, are reduced. Moreover, the cross sectional dimension, e.g. the diameter, of the guide element may be reduced.

In a preferred embodiment of the inventive transportation device, the ratchets are spring-loaded, for enabling independent operation of the ratchets without any additional drive means.

In a preferred embodiment of the inventive transportation device, the ratchets have an effective surface acting on the gear wheels. In particular, the effective surface includes an inclined portion and a recess portion. The inclined portion enables the rotational movement of the gear wheels, whereas the recess portion securely and accurately holds the gear wheels in a position, where the gap between two subsequent teeth of said gear wheels is in the passage way of said suspension element.

In the following, further advantages and embodiments of the inventive method and the inventive clipping machine are described in conjunction with the attached drawings. Thereby, the expression "left", "right", "below" and "above" are referred to the drawings in an orientation of the drawings which allows the normal reading of the reference numbers.

BRIEF DESCRIPTION OF THE DRAWINGS

In the drawings:

FIG. 2: is a sectional view of the transportation device according to the present invention in a vertical plane through the guide element.

DETAILED DESCRIPTION OF THE INVENTION

Figure 1:
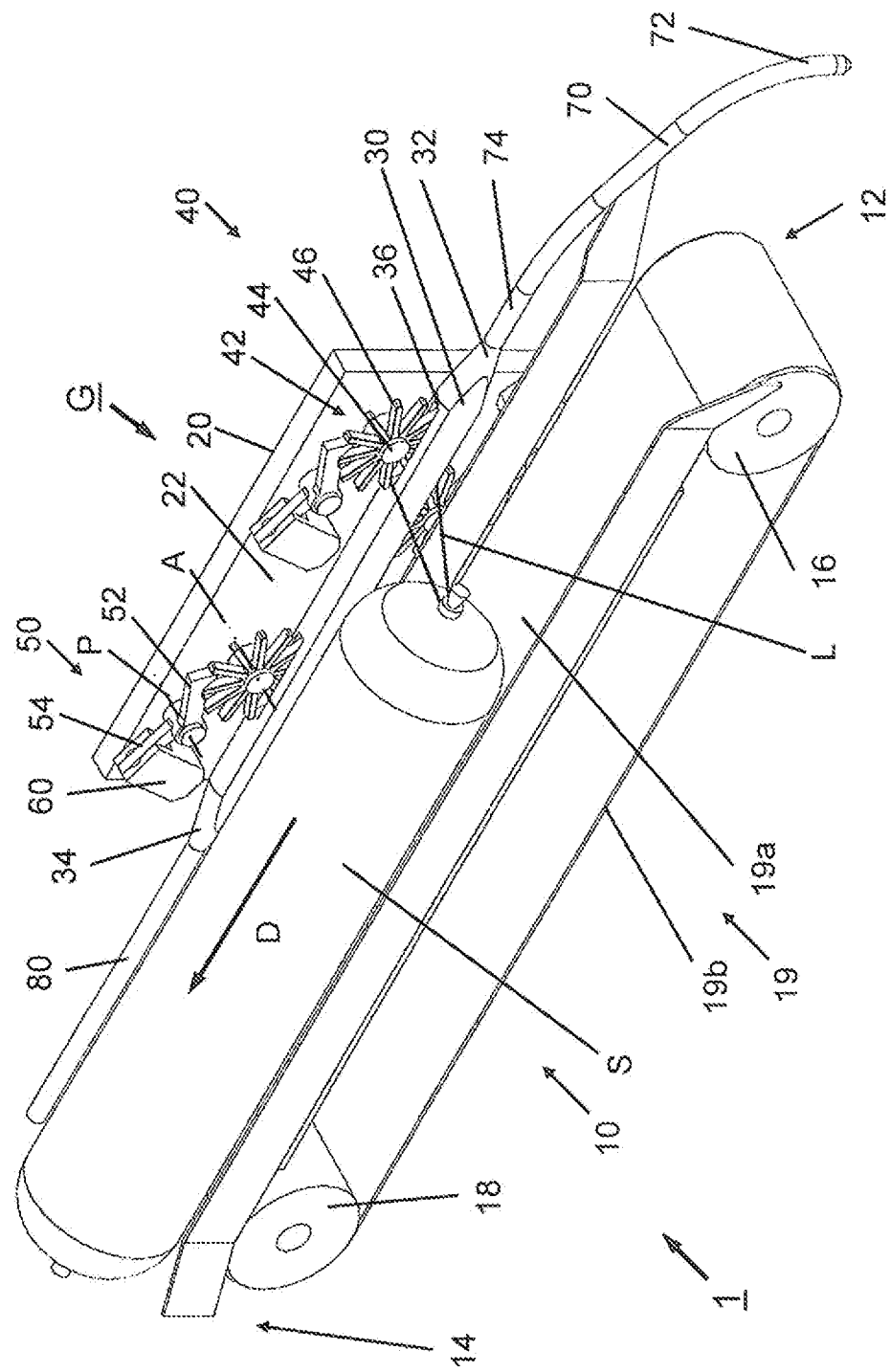
FIG. 1: is a perspective and schematic view of a transportation device for transporting sausage-shaped products according to the present invention.

FIG. 1 is a schematic view of a transportation device 1 for transporting sausage-shaped products S, like sausages, with suspension elements L, like loops, from a clipping machine to a handling device for said sausage-shaped products S according to the present invention. Transportation device 10 has a first or entry end 12 which is directed towards the clipping machine (not shown) and a second or exit end 14 extending away from said clipping machine in a transportation direction D.

Transportation device 1 according to FIG. 1 includes a conveying unit 10 in the form of a belt conveyor. Belt conveyor 10 includes a first roller 16 and a second roller 18, both arranged at least substantially horizontally and in succession in discharge direction D, and a conveyor belt 19 wound around first and second rollers 16, 18. Conveyor belt 19 has an upper run 19a and a lower run 19b. Belt conveyor 10 has a drive (also not shown) for driving belt 19 in order to transport sausage S out of the clipping machine in discharge direction D.

A guide unit G is positioned laterally to and above belt conveyor 10, with a vertically arranged frame element 20 which is aligned parallel to the longitudinal extension of belt conveyor 10 and in discharge direction D. At a side surface 22 of frame element 20, which faces to belt conveyor 10, a bar-shaped guide element 30 is arranged above and at least substantially parallel to belt conveyor 10 and, extends in discharge direction D, with a first end 32 directed towards the clipping machine and a second end 34 facing away from said clipping machine.

Supporting means 40 including four star or gear wheels 42 for supporting guide element 30 are arranged at surface 22 of frame element 20 facing belt conveyor 10. Four ratchets 50 are attached to side surface 22 of frame element 20, each ratchet 50, which will be explained in detail in conjunction with FIG. 2, comprises a first lever or engagement lever 52 pivotable about a pivot axis P, and is positioned laterally to one of the gear wheels 42 for engaging said gear wheel 42 with engagement lever 52.

As it can be seen in FIG. 1, each gear wheel 42 has a centre hub 44 and a number of teeth 46 extending radially from centre hub 44. All teeth 46 have the same length and are arranged in regular intervals around centre hub 44. Teeth 46 engage guide element 30 by recesses 36 provided in the upper and lower surface of guide element 30.

Transportation device 1 further comprises a catching unit 70 in the form of a catching needle. Needle 70 has a first end 72 and a second end 74. Needle 70 is mounted by its second end 64 to first end 32 of guide element 30 and extends with its first end 72 towards the clipping machine. As it can be seen in FIG. 1, needle 70 has a generally circular cross-section and is bent downwardly to reach into the closing area of the clipping machine and to catch a loop attached to the sausage S just produced in said clipping machine.

At second end 34 of guide element 32, a guide rail 80 for guiding loop L of sausage S to a storing element, like a smoking rod, is arranged, extending horizontally in discharge direction D.

FIG. 2 is a sectional view of the transportation device 1 according to the present invention shown in FIG. 1, in a vertical plane through the guide element 30.

As it can be seen in FIG. 2, four gear wheels 42 engage horizontally aligned guide element 30. Two gear wheels 42 are arranged above guide element 30 and two gear wheels 42 are positioned below guide element 30. Each upper gear wheel 42 is positioned above the respective lower gear wheel 42, and with a horizontal offset thereto in the direction toward the not shown clipping machine. That means, recesses 36 in guide element 30 are not positioned vertically above each other and thus, they do not overlap each other. Accordingly, dependent on the necessary depth of recesses 36, the vertical height, or its diameter respectively, of guide element 30 may be chosen as small as possible.

Recesses 36 according to FIG. 2 have an approximately semicircular shape for enabling gear wheels 42 to engage said recesses 36. The diameter of recesses 36 corresponds at least to the diameter of gear wheels 42. The vertical depth of recesses 36 is slightly smaller than the length of teeth 44 to provide a passage way for suspension loop L between the upper surface of guide element 30 and the lower most point of centre hub 42, as well as the lower surface of guide element 30 and the upper most point of centre hub 42 respectively.

As it can be seen in FIG. 1, the horizontal width of recesses 36 in the direction normal to discharge direction D corresponds at least to the respective width of gear wheels 42, or at least to the respective width of teeth 46 of gear wheels 42. Centre hub 44 of gear wheels 42 may be larger in width than teeth 46, since only teeth 46 engage recesses 36 of guide element 30.

As mentioned above four ratchets 50 are provided, each of which engages one of the four gear wheels 42. Each ratchet 50 comprises first lever or engagement lever 52, and a second lever 54 coupled to engagement lever 52. Levers 52, 54 are commonly pivotable about pivot axis P. The free end of second lever 54 is coupled to an actuation device 60. Actuation device 60 includes a housing 62 attached to side surface 22 of frame element 20, and an actuation element in the form of a spring 64, which, according to FIG. 2, is a compression spring, accommodated in housing 62. Spring 64, or its actuation direction respectively, is aligned vertically to second lever 54, for acting on second lever 54, whereby the free end of engagement lever 52 is urged against the outer ends of teeth 46 of the respective gear wheel 42.

As it further can be seen in FIG. 2, the effective surface of engagement lever 52 which faces the respective star wheel 42, has an inclined portion 52a and a recess portion 52b. Inclined portion 52a extends from the free end of engagement lever 52 towards pivot axis P, and terminates in recess portion 52b which is positioned approximately in the middle of engagement lever 52. In the region of the inclined portion 52a, the vertical height of engagement lever 52 reduces from its free end, where the height is maximal, towards recess portion 52b. The remaining portion of engagement lever 52 has an approximately constant vertical height. The dimension of recess portion 52a in the longitudinal direction of lever 52 corresponds to the respective circumferential dimension of the teeth 46 of gear wheels 42.

The maximum length of inclined portion 52a is approximately equal to the gap between two subsequent teeth 46 of gear wheel 42, in particular to the maximum distance between the free ends of two subsequent teeth 46 of gear wheel 42, to enable inclined portion 52a to engage the gap between the respective next two subsequent teeth 46 of gear wheel 42, when gear wheel 42 is rotated about axis A by a suspension loop pulled over guide element 30.

While producing a sausage-shaped product or sausage S, filling material is fed into a tubular packaging material, which is closed by a closure means, like a closure clip, when a predetermined portion of filling material has bee fed. Normally, together with said clip, a suspension loop S is fixed to the respective end of the sausage S. While feeding said loop L to the closing tools and the closure clip respectively, said loop L is caught by catching unit or catching needle 70 which engages suspension loop L. During the filling process, sausage S is positioned at upper run 19a of belt 19 of belt conveyor 10, with the end including suspension loop L directed towards the clipping machine.

For discharging sausage S just produced from the clipping machine, belt conveyor 10 is driven by a respective drive (not shown), whereby sausage S is transported in discharge direction D. Thereby, loop L caught by catching needle 70 is shifted along needle 70, guide element 30 and guide rail 80. Subsequent to guide rail 80, a storing element, like a smoking rod may be provided for storing sausage S thereon.

While passing guide element 30, loop L engages the gap between two subsequent teeth 46 of the first upper star wheel 42 from the right side according to FIGS. 1 and 2, and indicated as position L1 in FIG. 2, at the upper side of guide element 30. During the further movement of sausage S in discharge direction D, loop L is pulled over guide element 30. Thereby, gear wheel 42 is rotated clockwise about axis A.

While leaving the gap between subsequent teeth 46 of gear wheel 42 at the left side of said first gear wheel 42, loop L engages the gap between subsequent teeth 46 of the second, lower gear wheel 42 at the lower side of guide element 30.

During the rotational movement of first upper gear wheel 42, engagement lever 52, and second lever 54 respectively, has been pivoted counterclockwise, actuated by the free end of tooth 46 of first upper gear wheel 42, which initially has been positioned in recess portion 52b, and which has been moved along inclined portion 52a.

After said free end of tooth 46 of first upper gear wheel 42 has left engagement lever 52, engagement lever 52 has been pivoted clockwise about pivot axis P, actuated by spring 64 acting on the free end of second lever 54.

Inclined portion 52a of engagement lever 52 thereby acts on the free end of the subsequent tooth 46. Said subsequent tooth 46 is guided along inclined portion 52a, at least by its left end portion, towards recess portion 52b, and the free end of said tooth 46 engages recess portion 52b. Accordingly, a next recess between two subsequent teeth 46 of gear wheel 42 at the right side of said first gear wheel 42 has been positioned at the upper surface of guide element 30 in order to accommodate suspension loop L of the next sausage S to be produced, as shown in FIGS. 1 and 2.

It has to be understood, that ratchets 50 at all gear wheels 42 are positioned and aligned as described above, in order to provide a gap at the respective upper and/or lower surface of guide element 30 enabling accommodating suspension loop L of the sausage S to be guided along guide element 30.

Transportation device 1 has been described as comprising 4 gear wheels 42, two upper gear wheels 42 and two lower gear wheels 42. Naturally, according to the length of guide element 30, more than four gear wheels 42 may be provided for supporting guide element 30. In a simple case, guide device 30 may also be held only by three gear wheels 42.

Teeth 46 of transportation device 1 according to FIGS. 1 and 2 have an approximately cuboid shape with parallel side surfaces. Teeth 46 may also have any other suitable shape, like a pyramidal shape including a plat end or a tip end. In this case, the shape of the recesses should also correspond the shape of the teeth.

The ratchets for engaging the gear wheels 42 may also have any other suitable construction than that shown in FIGS. 1 and 2. For example, the actuation unit 60 may directly act on the engagement lever 52, whereby a second lever is not necessary. It has some importance, that the ratchet 50 is constructed to enable a loop to be guided along the guide element 30, and that the gear wheel 42 is brought in a position by the ratchet 50, in which a gap between two subsequent teeth is provided at the respective surface of the guide element 30 to allow a loop to engage said gap without being blocked.

Other suitable actuation devices may be provided, like tension springs or elastic elements made of rubber or the like, for acting on the engagement lever 52.

Moreover, the cross-section of the catching needle 78 may depart from the circular cross-section shown in FIG. 1. Also, the guide element 30 may have any suitable cross section like a circular or a rectangular cross-section.

The conveying unit 10 may not necessarily be a belt conveyor. Any suitable conveyor means may be used to transport the sausage-shaped products along the catching needle 72 and the guide element 30. In the simplest case, a chute may be provided on which the sausage-shaped products slides along the guide element. Alternatively, other driven conveying means may be used, like chain conveyors including engagement elements like hooks, for engaging and pulling the sausage-shaped product along the guide element.

It has to be understood, that a housing may be provided for accommodating the guide device, for preventing an unintentional or accidental engagement of the moving parts of the guide device, like the gear wheels.

Finally, the ratchets 50 may also be formed by other means as long as these other means are able to keep reversibly each gear wheel in a stand by position such that the teeth of the gear wheel allows the entrance of a suspension loop into the intermediate portion between two successive teeth of a gear wheel.

The invention claimed is:

1. A transportation device for transporting sausage-shaped products, like sausages, with suspension elements from a clipping machine to a handling device for said sausage-shaped products including a bar-shaped storing element, the transportation device comprising:
    a conveying unit for conveying a sausage-shaped product just produced out of the clipping machine in a transportation direction,
    a catching unit for catching the suspension element attached to one end of the sausage-shaped product, and a guide unit for guiding the suspension element caught by the catching unit to said handling device, and comprising a longitudinally extending guide element and supporting means for supporting the guide element, wherein the supporting means provide a passage way for the suspension element to be guided along the guide element,
where the supporting means includes gear wheels arranged rotatably about an at least substantially horizontally aligned axis and engaging the guide element; and where ratchets are provided for engaging the gear wheels and adapted to position a gap between two subsequent teeth of said gear wheels in the passage way of said suspension element.

2. The transportation device according to claim 1, wherein recesses are provided in the guide element, into which the gear wheels engage.

3. The transportation device according to claim 2, wherein the recesses in the guide element correspond to the shape of the gear wheels.

4. The transportation device according to claim 1, wherein at least four gear wheels are provided, two positioned below the guide element and two positioned above the guide element.

5. The transportation device according to claim 4, wherein at least four ratchets are provided, each of which engage one of the at least four gear wheels.

6. The transportation device according to claim 4, wherein the gear wheels positioned below the guide element and the gear wheels positioned above the guide element are aligned with a horizontal offset to each other.

7. The transportation device according to claim 1, wherein the ratchets are spring-loaded.

8. The transportation device according to claim 1, wherein the ratchets have an effective surface acting on the gear wheels.

9. The transportation device according to claim 8, wherein the effective surface includes an inclined portion and a recess portion.

\* \* \* \* \*